United States Patent [19]

Markley

[11] 4,440,627
[45] Apr. 3, 1984

[54] CATALYTIC REFORMING PROCESS

[75] Inventor: Gerald E. Markley, Baton Rouge, La.

[73] Assignee: Exxon Research and Engineering Co., Florham Park, N.J.

[21] Appl. No.: 482,510

[22] Filed: Apr. 6, 1983

Related U.S. Application Data

[63] Continuation-in-part of Ser. No. 473,956, Mar. 10, 1983, abandoned, which is a continuation-in-part of Ser. No. 336,422, Dec. 31, 1981.

[51] Int. Cl.$^3$ .............................................. C10G 35/06
[52] U.S. Cl. ...................................... 208/65; 208/64; 208/138; 208/139
[58] Field of Search .................... 208/64, 65, 138, 139

[56] References Cited

U.S. PATENT DOCUMENTS

| | | | |
|---|---|---|---|
| 3,415,737 | 12/1968 | Kluksdahl | 208/138 |
| 3,544,451 | 12/1970 | Mitsche et al. | 208/138 |
| 4,356,081 | 10/1982 | Gallagher et al. | 208/139 |

Primary Examiner—Curtis R. Davis

Attorney, Agent, or Firm—Llewellyn A. Proctor

[57] ABSTRACT

A process wherein, in a series of reforming zones, employing one or a series of reactors, each of which contains a bed, or beds of catalyst, the catalyst in the rearward most reforming zones is constituted of supported platinum and a relatively high concentration of rhenium, and the catalyst in the forward most reforming zone is constituted of platinum, or platinum and a relatively low concentration of a promoter metal, especially rhenium. In the rearward reaction zones, at least 40 percent, and preferably from 40 percent to about 90 percent, based on the total weight of catalyst in the reactor, or reactors of the unit, is constituted of a rhenium promoted platinum catalyst, the weight ratio of rhenium:platinum of which at least about 1.5:1, and preferably 2:1, or greater. The beds of catalyst are contacted at start-of-run temperatures ranging from about 875° F. to about 935° F. with a hydrocarbon or naphtha feed, and hydrogen, at reforming conditions to produce a hydrocarbon, or naphtha product of improved octane, and the product is withdrawn.

36 Claims, No Drawings

CATALYTIC REFORMING PROCESS

This is a continuation-in-part of Application Ser. No. 473,956, filed Mar. 10, 1983, and now abandoned, which in turn is a continuation-in-part of Application Ser. No. 336,422, filed Dec. 31, 1981.

RELATED APPLICATIONS

This application contains subject matter which is related to that found in Application Ser. No. 082,804 by George A. Swan, filed Oct. 9, 1979; Application Ser. No. 082,805 by Soni O. Oyekan and George A. Swan, filed Oct. 9, 1979; Application Ser. No. 271,528 by George A. Swan, filed June 8, 1981, and now abandoned; and Application Ser. No. 336,495, filed Dec. 31, 1981 by William E. Winter and Gerald E. Markley.

BACKGROUND OF THE INVENTION AND PRIOR ART

Catalytic reforming, or hydroforming, is a well established industrial process employed by the petroleum industry for improving the octane quality of naphthas or straight run gasolines. In reforming, a multi-functional catalyst is employed which contains a metal hydrogenation-dehydrogenation (hydrogen transfer) component, or components, substantially atomically dispersed upon the surface of a porous, inorganic oxide support, notably alumina. Noble metal catalysts, notably of the platinum type, are currently employed, reforming being defined as the total effect of the molecular changes, or hydrocarbon reactions, produced by dehydrogenation of cyclohexanes and dehydroisomerization of alkylcyclopentanes to yield aromatics; dehydrogenation of paraffins to yield olefins; dehydrocyclization of paraffins and olefins to yield aromatics; isomerization of n-paraffins; isomerization of alkylcycloparaffins to yield cyclohexanes; isomerization of substituted aromatics; and hydrocracking of paraffins which produces gas, and inevitably coke, the latter being deposited on the catalyst.

Platinum has been widely commercially used in recent years in the production of reforming catalysts, and platinum-on-alumina catalysts have been commercially employed in refineries for the last few decades. In the last decade, additional metallic components have been added to platinum as promoters to further improve the activity or selectivity, or both, of the basic platinum catalyst, e.g., iridium, rhenium, tin, and the like. Some catalysts possess superior activity, or selectivity, or both, as contrasted with other catalysts. Platinum-rhenium catalysts by way of example possess admirable selectivity as contrasted with platinum catalysts, selectivity being defined as the ability of the catalyst to produce high yields of $C_5^+$ liquid products with concurrent low production of normally gaseous hydrocarbons, i.e., methane and other gaseous hydrocarbons, and coke.

In a conventional process, a series of reactors constitute the heart of the reforming unit. Each reforming reactor is generally provided with fixed beds of the catalyst which receive downflow feed, and each is provided with a preheater or interstage heater, because the reactions which take place are endothermic. A naphtha feed, with hydrogen, or recycle gas, is currently passed through a preheat furnace and reactor, and then in sequence through subsequent interstage heaters and reactors of the series. The product from the last reactor is separated into a liquid fraction, and a vaporous effluent. The former is a $C_5^+$ liquid product. The latter is a gas rich in hydrogen, and usually contains small amounts of normally gaseous hydrocarbons, from which hydrogen is separated and recycled to the process to minimize coke production.

Two major types or reforming are broadly practiced in the multi reactor units, both of which necessitate periodic reactivation of the catalyst, the initial sequence of which requires regeneration, i.e., burning the coke from the catalyst. Reactivation of the catalyst is then completed in a sequence of steps wherein the agglomerated metal hydrogenation-dehydrogenation components are atomically redispersed. In the semi-regenerative process, a process of the first type, the entire unit is operated by gradually and progressively increasing the temperature to maintain the activity of the catalyst caused by the coke deposition, until finally the entire unit is shut down for regeneration, and reactivation, of the catalyst. In the second, or cyclic type of process, the reactors are individually isolated, or in effect swung out of line by various manifolding arrangements, motor operated valving and the like. The catalyst is regenerated to remove the coke deposits, and then reactivated while the other reactors of the series remain on stream. A "swing reactor" temporarily replaces a reactor which is removed from the series for regeneration and reactivation of the catalyst, until it is put back in series. In some reforming units, features of the semiregenerative operation are found in conjunction with cyclic operations.

Various improvements have been made in such processes to improve the performance of reforming catalysts in order to reduce capital investment or improve $C_5^+$ liquid yields while improving the octane quality of naphthas and straight run gasolines. New catalysts have been developed, old catalysts have been modified, and process conditions have been altered in attempts to optimize the catalytic contribution of each charge of catalyst relative to a selected performance objective. Nonetheless, while any good commercial reforming catalyst must possess good activity, activity maintenance and selectivity to some degree, no catalyst can possess even one, much less all of these properties to the ultimate degree. Thus, one catalyst may possess relatively high activity, and relatively low selectivity and vice versa. Another may possess good selectivity, but its selectivity may be relatively low as regards another catalyst. Platinum-rhenium catalysts, among the handful of successful commercially known catalysts, maintain a rank of eminence as regards their selectivity; and they have good activity. Nonetheless, the existing world-wide shortage in the supply of high octane naphtha persists and there is little likelihood that this shortage will soon be in balance with demand. Consequently, a relatively small increase in the $C_5^+$ liquid yield can represent a large credit in a commercial reforming operation.

Variations have been made in the amount, and kinds of catalysts charged to the different reforming reactors of a series to modify or change the nature of the product, or to improve $C_5^+$ liquid yield. Different catalysts, with differing catalytic metal components, have also been used in the different reactors of a series. The concentrations of the catalytic metal components on catalysts containing qualitatively the same metals have also been varied to provide progressively increasing, or decreasing, catalytic metals distributions. For example, reference is made to Application Ser. No. 082,805, supra, which discloses a process wherein the ratio and proportion of rhenium relative to platinum is modified on the catalysts dispersed between the several reactors of a series to provide admirably high stability credits and higher conversions of the product to $C_5{}^+$ naphthas. In accordance with the process, a series of reactors, each contains a bed, or beds, of a platinum-rhenium catalyst. The catalysts in the lead reactors are constituted of supported platinum and relatively low concentrations of rhenium, with the catalyst in the last reactor of the series being constituted of platinum and a relatively high concentration of rhenium, the amount of rhenium relative to the platinum in the last reactor being present in an atomic ratio of at least about 1.5:1 and higher, or preferably 2:1, and higher. In its preferred aspects, the lead reactors of the series are provided with platinum-rhenium catalysts wherein the atomic ratio of the rhenium:platinum ranges from about 0.1:1 to about 1:1, preferably from about 0.3:1 to about 1:1, and the last reactor of the series is provided with a platinum-rhenium catalyst wherein the atomic ratio of the rhenium:platinum ranges from about 1.5:1 to about 3:1, or preferably from about 2:1 to about 3:1.

In a reforming operation, one or a series of reactors, or a series of reforming zones, are employed. Typically, a series of reactors are employed, e.g., three or four reactors, these constituting the heart of the reforming unit. It is known, and described in the '805 Application, that the amount of coke produced in an operating run increases progressively from a leading reactor to a subsequent reactor, or from the first reactor to the last reactor of the series as a consequence of the different types of reactions that predominate in the several different reactors. The sum-total of the reforming reactions, supra, occurs as a continuum between the first and last reactor of the series, i.e., as the feed enters and passes over the first fixed catalyst bed of the first reactor and exits from the last fixed catalyst bed of the last reactor of the series. The reactions which predominate between the several reactors differ dependent principally upon the nature of the feed, and the temperature employed within the individual reactors. In the initial reaction zone, or first reactor, which is maintained at a relatively low temperature, the primary reaction involves the dehydrogenation of naphthenes to produce aromatics. The isomerization of naphthenes, notably $C_5{}^+$ and $C_6$ naphthenes, also occurs to a considerable extent. Most of the other reforming reactions also occur, but only to a lesser, or smaller extent. There is relatively little hydrocracking, and very little olefin or paraffin dehydrocyclization occurs in the first reactor. Within the intermediate reactor, or reactors, the temperature is maintained somewhat higher than in the first, or lead reactor of the series, and the primary reactions in the intermediate reactor, or reactors, involve the isomerization of naphthenes and paraffins. Where, e.g., there are two reactors disposed between the first and last reactor of the series, the principal reaction involves the isomerization of naphthenes, normal paraffins and isoparaffins. Some dehydrogenation of naphthenes may, and usually does occur, at least within the first of the intermediate reactors. There is usually some hydrocracking, at least more than in the lead reactor of the series, and there is more olefin and paraffin dehydrocyclization. The third reactor of the series, or second intermediate reactor, is generally operated at a somewhat higher temperature than the second reactor of the series. The naphthene and paraffin isomerization reactions continues as the primary reaction in this reactor, but there is very little naphthene dehydrogenation. There is a further increase in paraffin dehydrocyclization, and more hydrocracking. In the final reaction zone, or final reactor, which is operated at the highest temperature of the series, paraffin dehydrocyclization, particularly the dehydrocyclization of the short chain, notably $C_6$ and $C_7$ paraffins, is the primary reaction. The isomerization reactions continue, and there is more hydrocracking in this reactor than in any of the other reactors of the series.

It is also generally known that the increased levels of coke in the several reactors of the series causes considerable deactivation of the catalysts. Whereas the relationship between coke formation, and rhenium promotion to increase catalyst selectivity is not kown with any degree of certainty because of the extreme complexity of these reactions, it is believed that the presence of the rhenium minimizes the adverse consequences of the increased coke levels, albeit it does not appear to minimize coke formation in any absolute sense. Accordingly, in the invention described by the '805 Application, supra, the concentration of the rhenium is increased in those reactors where coke formation is the greatest, but more particularly in the last reactor of the series. Moreover, in one of its forms the catalysts within the series of reactors are progressively staged with respect to the rhenium concentration, he rhenium concentration being increased from the first to the last reactor of the series such that the rhenium content of the platinum-rhenium catalysts is varied significantly to counteract the normal effects of coking.

These variations, and modifications have generally resulted in improving the process with respect to one selected performance objective, or another, and this is particularly so with respect to the process described by Application Ser. No. 082,805, supra, which has produced increased stability, and increased $C_5{}^+$ liquid yields.

It is, nonetheless, an objective of this invention to provide a further improved process, particularly a process capable of achieving yet higher conversions of feed naphthas to $C_5{}^+$ liquids, especially at high severities, and more particularly during start-up, as contrasted with prior art processes.

This object and others are achieved in accordance with improvements made in a process of operating a reforming unit wherein, in one or a series of reactors each of which contains a bed, or beds, of reforming catalyst over which a naphtha feed, inclusive of a highly paraffinic naphtha feed, is passed thereover at reforming conditions, a major quantity of the total catalyst charged to the reactors is constituted of a high rhenium platinum catalyst, or rhenium promoted platinum catalyst wherein the rhenium is present relative to the platinum in weight concentration of at least about 1.5:1, and higher, and preferably from about 2:1, and higher, and concentrated within the most rearward reactors of the series. The catalyst bed, or beds, of the forwardmost reactor, or reactors, of the series contains a platinum catalyst, or catalytic metal promoted platinum catalyst, suitably a low rhenium, rhenium promoted platinum catalyst, or catalyst which contains rhenium in concentration providing a weight ratio of rhenium:platinum of about 1:1. (Reference is made to Application Ser. No. 336,495 by William E. Winter and Gerald E. Markley, supra.) In accordance with the present invention, the reactor unit is operated during start-up of the unit, at temperatures above about 875° F. Equivalent Isothermal Temperature (E.I.T.), preferably at temperatures ranging from about 875° F. to about 935° F., more preferably at from about 895° F. to about 930° F., to maximize C$_5$+ liquid yields.

The present invention requires the use of a high rhenium, platinum-rhenium catalyst within the reforming zones wherein the primary, or predominant reactions involves the isomerization of naphthenes, normal paraffins and isoparaffins and the dehydrocyclization of paraffins, and olefins. Within these zones, there is employed a platinum-rhenium catalyst which contains rhenium in concentration sufficient to provide a weight ratio of rhenium:platinum of at least about 1.5:1, and higher, preferably at least about 2:1, and higher, and more preferably from about 2:1 to about 3:1. The zone, or zones wherein the isomerization reactions predominate follows the zone wherein naphthene dehydrogenation is the primary, or dominant reaction. The isomerization zone, or zones, where a series of reactors constitute the reforming unit, are generally found at the exit side of the first or lead reactor, or in the intermediate reactor, or reactors, of the series, or both. The paraffin dehydrocyclization zone, where a series of reactors constitute the reforming unit, is invariably found in the last reactor, or final reactor of the series. Of course, where there is only a single reactor, quite obviously the isomerization reactions will predominate in the bed, or beds, defining the zone following that wherein naphthene dehydrogenation is the primary reaction. The paraffin dehydrocyclization reaction will predominate in the catalyst bed, or beds, defining the next zone downstream of the isomerization zone, or zone located at the product exit side of the reactor. Where there are multiple reactors, quite obviously the paraffin dehydrocyclization reaction will predominate in the catalyst bed, or beds defining a zone located at the product exit side of the last reactor of the series. Often the paraffin dehydrocyclization reaction is predominant of the sumtotal of the reactions which occur within the catalyst bed, or beds constituting the last reactor of the series dependent upon the temperature and amount of catalyst that is employed in the final reactor vis-a-vis the total catalyst contained in the several reactors, and temperatures maintained in the other reactors of the reforming unit.

In all of its aspects, the naphthene dehydrogenation zone, or forwardmost reactor, or reactors, of the reforming unit contains at least about 10 weight percent of an umpromoted platinum catalyst, or catalytic metal promoted platinum catalyst, suitably a low rhenium, rhenium promoted platinum catalyst containing rhenium:platinum in weight ratio of up to about 1.2:1, and preferably up to about 1:1. The remainder of the catalyst of the unit is constituted of a high rhenium, rhenium promoted platinum catalyst, or catalyst containing a weight ratio of rhenium:platinum of at least 1.5:1, and higher. Conversely, the rearwardmost reactor, or reactors, of the reforming unit will contain at least 40 percent, preferably from 40 percent to about 90 percent of the total weight of catalyst charge in the reactors, as a high rhenium, rhenium promoted platinum catalyst. It has been found that this optimum fraction of the total catalyst weight as unpromoted platinum catalyst, or low rhenium, rhenium promoted platinum catalyst contained in the forwardmost reactor, or reactors, of the unit is a function of operating conditons, especially as relates to reactor pressure and recycle gas rate. These catalyst combinations will provide, over the total length of an operating run, maximum catalyst activity and C$_5$+ liquid yield at good product octane levels. Moreover, by the use of relatively high temperatures, i.e., temperature above about 875° F., especially from about 875° F. to about 935° F., and more preferably from about 895° F. to about 925° F., at start-up, the C$_5$+ liquid yields yields will be optimized at good product octane levels. More particularly, it is found that the C$_5$+ liquid yield is optimized in a semi-regenerative operation by the use during start-up of temperatures ranging from about 875° F. to about 935° F., preferably from about 895° F. to about 925° F., and in a cyclic operation by the use, at least dring start-up or the initial portion of the operating run, of temperatures ranging from about 905° F. to about 935° F., preferably from about 950° F. to about 930° F. It is believed that a temperature in this range is sufficiently high to promote rapid initial coke formation and improve initial yields. In contrast, operation at higher temperature at start of run, i.e., 950° F., results in little or no yield improvement but rapid catalyst deactivation.

It was previously found, and disclosed in the '805 Application, supra, that staging rhenium promoted platinum catalysts in the several reactors of a reforming unit based on rhenium concentration, particularly the placement of high rhenium, rhenium promoted platinum catalysts in the final reactor of a series, provided increased activity and yield credits relative to the use of the more conventional rhenium stabilized platinum catalyst. Quite surprisingly, however, it has now been found that yet considerably higher activity and yield credits can be obtained by the more extensive use of a high rhenium, rhenium promoted platinum catalyst wherein, in such operation,, the high rhenium, rhenium promoted platinum catalyst constitutes at least forty percent, and preferably from about 40 percent to about 90 percent, of the total catalyst charged to the several reactors of a reforming unit, and the catalyst is concentrated within at least the final reactors, or reaction zones, of the series. Conversely, it is found that at least about 10 percent of the forewardmost reactor volume must contain a platinum, or low rhenium platinum-rhenium, catalyst; this being the reactor or reaction zone wherein naphthene dehydrogenation is the principal reaction. It is found, e.g., that using a high rhenium, platinum-rhenium catalyst in the final and intermediate reaction zones, wherein said high rhenium, platinum-rhenium catalysts constitutes at least 40 weight percent of the total catalyst charge, there is obtained higher activity and C$_5$+ liquid yields than is obtained when using catalyst systems where the high rhenium catalysts constitutes less than forty percent of total catalyst charge. Whereas the reasons for these advantages are not clear, general observations and conclusions can be made. Thus it is known that dehydrocyclization and cracking of lower molecular weight paraffins, i.e., C$_6$ and C$_7$ paraffins, are the predominant reactions in the last reactor or last reaction zone of a series. These reactions require high severity conditions, and the reactions proceed faster with metal promoted platinum catalysts, especially high rhenium, platinum rhenium catalysts. More importantly, selectivity for light paraffin dehydrocyclization, as opposed to cracking, is increased by use of a high rhenium, platinum rhenium catalyst in the final reaction zone, this resulting in higher C$_5$+ liquid yields. Moreover, it is known that naphthene dehydrogenation is the predominant reaction in the lead reaction zone. These reactions, because such reactions are quite rapid even at moderate or high severities, occur readily even at lower severities where paraffins react more slowly. The lead reaction zone is defined by reforming reactions wherein naphthene dehydrogenation is the primary reaction, this zone being defined by reactions which occur over catalyst typically constituting about 10 percent of the total catalyst of the several reaction zones.

In the intermediate reaction zone, or zones, at intermediate severities, higher molecular weight paraffins, i.e., $C_8$, $C_9$, $C_{10}$, and $C_{10}+$ paraffins, undergo dehydrocyclization and cracking reactions. While much slower than naphthene dehydrogenation reactions, these higher molecular weight paraffins are considerably more reactive than the $C_6$ and $C_7$ paraffins. The isomerization reactions predominate in the intermediate reaction zone, or zones.

It is found that the use of a high rhenium, platinum rhenium catalyst in the lead raction zone causes significant cracking of higher molecular weight paraffins as well as naphthene dehydrogenation; but entirely too much paraffin cracking. However, the use of a high rhenium, platinum rhenium catalyst in the intermediate, as well as the final reaction zones improves yields. It is surprising that the use of a high rhenium, platinum:rhenium catalyst in the lead reaction zone, which constitutes a relatively small volume relative to the total of the reaction zones, results in excessive cracking of higher molecular weight paraffins whereas, in contrast, the use of the same catalyst in the intermediate reaction zone, or zones, which constitutes a considerably larger volume of the total of the reaction zones (perhaps about 40 percent) results in less cracking and better dehydrocyclization activity for the same paraffins. Hence, the finding that the use of a platinum catalyst, or low rhenium, platinum-rhenium catalyst in the lead reaction zone where principally naphthene dehydrogenation is the predominant reaction, and the use in all subsequent reaction zones of a high rhenium, platinum-rhenium catalyst can yield further benefits over those disclosed in the '805 Application is surprising.

In accordance with this invention, the final reaction zones of the unit are provided with a high rhenium, rhenium promoted platinum catalyst. Thus, the more rearward reforming zones would contain at least 40 weight percent, and preferably from about 40 weight percent to about 90 weight percent, of the total catalyst charge as high rhenium, platinum-rhenium catalyst. Conversely, a platinum catalyst, or low rhenium platinum-rhenium catalyst is charged into the first, or initial reaction zone of the series wherein the naphthene dehydrogenation reaction predominates. In reforming units, the first reactor of the series is provided with sufficient of the platinum, or low rhenium, platinum-rhenium catalyst to promote naphthene dehydrogenation, this reactor generally containing about 10 percent, or possibly from 10 percent to 60 percent of an unpromoted platinum catalyst, or low rhenium, rhenium promoted platinum catalyst wherein the weight ratio of rhenium:platinum ranges up to about 1.2:1, preferably up to about 1:1. The reforming unit, ideally, will be operated, in a relative sense, at somewhat higher severity, i.e., lower pressure and gas rates than a unit charged with a lesser concentration of the high rhenium, platinum-rhenium catalyst; suitably at about 230 psig of hydrogen partial pressure, or less. The reactor units, moreover, is operated at relatively high temperatures; in a semi-regenerative operation, at start-up, at temperatures ranging from about 875° F. to about 935° F., preferably from about 895° F. to about 925° F., and a cyclic operation at temperatures ranging from about 950° F. to about 935° F., preferably from about 905° F. to about 930° F. Gas make is decreased, and $C_5+$ liquid yield increased as compared with operations otherwise similar exept that the unit is operated at lower, more conventional temperatures during the start of the run.

It was exemplified in Application Ser. No. 082,805, supra, that yield and activity credits could be obtained by charging the final reactor of a multi reactor reforming unit with a high rhenium, rhenium promoted platinum catalyst, and the lead and intermediate reactors with a more conventional platinum-rhenium catalyst wherein the rhenium:platinum ratio approximated 1:1. These credits were demonstrated at relatively low pressure cyclic conditions (175 psig, 3000 SCF/B, 950° F. Equivalent Isothermal Temperature [EIT]), relatively high pressure semi-regenerative conditions (400 psig, 6000 SCF/B, around 900° F. start-of-run [SOR] temperature) and relatively high pressure "semi-cyclic" conditions (425 psig, 2500 SCF/B, approximately 900° F. SOR temperature). In each case these credits were about $+0.5$ to $+1$ LV% $C_5+$ yield and $+5$ to 15% initial activity for staged systems comprising 30–40% of a high rhenium, rhenium promoted platinum catalyst in the final reactor of the series, as contrasted with a conventional operation. Now, it has been found that these credits can be further increased by operation with additional staging of the high rhenium, rhenium promoted platinum catalyst.

(I) The following data, by way of comparison, was presented in the '805 Application. All units are in terms of weight except as otherwise specified. The data are demonstrative of the activity and yield advantages obtained by the use of a high rhenium platinum-rhenium catalyst in the tail reactor of a multiple unit reformer, with a low rhenium, platinum-rhenium catalyst in the several lead reactors, to wit:

DEMONSTRATIONS (I)

A series of platinum-rhenium catalyst of high rhenium content were prepared for demonstrative purposes from portions of particulate alumina of the type conventionally used in the manufacture of commercial reforming catalysts. These portions of alumina, i.e., 1/16 inch diameter extruders, were calcined for 3 hours at 1000° F. followed by equilibration with water vapor for 16 hours. Impregnation of metals upon the supports in each instance was achieved by adding $H_2PtCl_6$, $HReO_4$, and HCl in aqueous solution, while carbon dioxide was added as an impregnation aid. After a two hour equilibration, a mixture was dried, and then placed in a vacuum oven at 150° C. for a 16 hour period.

Prior to naphtha reforming, the catalyst was heated to 950° F. in 6% $O_2$ (94% $N_2$), and then soaked in $Cl_2/O_2$ (500 ppm $Cl_2$, 6% $O_2$, 5000 ppm $H_2$) for one hour. Following 3 hours in 6% $O_2$ at 950° F., the catalyst was cooled to 850° F., reduced with 1.5% $H_2$ in $N_2$, and then presulfided with $H_2S$ in this reducing gas to achieve the desired catalyst sulfur level.

A low rhenium, rhenium promoted catalyst was employed in the forward reactor, or reactors of a unit. This catalyst, which contained rhenium:platinum in weight ratio of 1:1, was obtained already made from a catalyst manufacturer. However, this catalyst was made, and prepared in similar manner with the high rhenium, rhenium promoted platinum catalysts.

Inspections on the feed employed in the tests (Feedstocks A and B) are given in Table I.

TABLE I

|  | Feedstock A Lt. Arabian Virgin Naphtha | Feedstock B Persian Gulf Paraffinic Naphtha | Feedstock C Arabian Virgin Light Paraffinic Naphtha |
|---|---|---|---|
| API Gravity | 59.7 | 58.9 | 59.7 |
| Sulfur, wppm | 0.5 | 0.5 | 0.5 |
| Nitrogen, wppm | <0.1 | <0.1 | <0.1 |
| ASTM Distillation |  |  |  |
| IBP° F. | 180 | 166 | 181 |
| 5% | 213 | 203 | 196 |
| 10 | 219 | 214 | 204 |
| 20 | 232 | 227 | 211 |
| 30 | 242 | 239 | 218 |
| 40 | 255 | 253 | 229 |
| 50 | 267 | 269 | 241 |
| 60 | 278 | 283 | 253 |
| 70 | 294 | 299 | 269 |
| 80 | 308 | 315 | 287 |
| 90 | 324 | 333 | 310 |
| 95 | 336 | 346 | 328 |
| FBP | 382 | 358 | 350 |

In a first cyclic simulation reforming run (Run 1), a high rhenium, platinum:rhenium catalyst containing 0.3% Pt/0.67% Re/1.1% $Cl_2$/0.15% S for use in all of the several reactors of a four reactor unit, with all four reactors on-stream, was prepared as previously described. In a second run (Run 2) all of the reactors of the series were provided with low rhenium catalysts containing 0.3% Pt/0.3% Re/1.1% $Cl_2$/0.15% S. The runs were conducted by passing the Light Arabian paraffinic naphtha through the series of reactors at 950° F. E.I.T., 175 psig, 3000 SCF/B which are the conditions necessary to produce a 102.0 RONC product. The results are given in Table II.

A third run (Run 3) was conducted under similar conditions with the same feed except that the three lead reactors were charged with the low rhenium catalysts, and the tail reactor only was charged with the high rhenium catalyst (28 wt. % of the total catalyst charge). The results are given in Table II.

In a fourth run (Run 4), a dry, calcined catalyst containing 0.29% Pt/0.72% Re/1.1% $Cl_2$/0.14% S was charged to the fourth, or tail reactor of a unit, and the first three reactors were charged with the low rhenium catalyst. This run was conducted with a more difficult to reform Persian Gulf Paraffinic naphtha at 950° F. E.I.T., 175 psig, 3000 SCF/B, at space velocity sufficient to produce a 100 RON product.

A fifth run (Run 5) conducted at identical conditions to those used in Run 4, but with low rhenium catalyst in all four of the reactors. This run, which should be compared with Run 4 is also given in Table II.

TABLE II

|  | Feedstock | Catalyst Activity Units | Yield $C_5^+$ LV % |
|---|---|---|---|
| Run 1 (high rhenium) | A | 96.0 | 69.3 |
| Run 2 (low rhenium) | A | 102.0 | 72.0 |
| Run 3 (low rhenium) lead/high rhenium tail reactor) | A | 102.0 | 72.5 |
| Run 4 (low rhenium | B | 92.0 | 75.5 |

TABLE II-continued

|  | Feedstock | Catalyst Activity Units | Yield $C_5^+$ LV % |
|---|---|---|---|
| lead/high rhenium tail reactor) |  |  |  |
| Run 5 (low rhenium) | B | 77.0 | 74.3 |

These data thus show, by comparison of Run 1 and Run 2, that the use of the high rhenium catalysts in the several reactors of the series considerably decreased the $C_5^+$ liquid yield, and octane number. This is believed due to the "cracking out" of aromatics precursors in the lead reactors. This conclusion is supported too by the 20 percent increase in light petroleum gases, principally $C_3$ and $C_4$ hydrocarbon, produced with the high rhenium catalysts.

A $C_5^+$ liquid yield credit, as shown by a comparison of Runs 2 and 3, is thus obtained by staging the low and high rhenium catalysts as described. The $C_5^+$ liquid yield credit is further confirmed by the increase in recycle gas hydrogen purity (approx. 1%) for the staged reactor system.

The improvement in catalyst activity, and yield as shown by the use of a high rhenium, rhenium promoted platinum catalyst in the final reactor of a series is thus mainfest. In addition to the improved activity, and high yield advantage utilizing the more difficult feed stock, the run utilizing the high rhenium catalyst in the tail reactor also demonstrates a far greater coke tolerance.

(II) The following data, by way of further comparison are given in Application Ser. No. 336,495, supra. All units are in terms of weight except as otherwise specified.

DEMONSTRATIONS (II)

(A) In accordance with this demonstration, a light Arabian Virgin paraffinic naphtha (Feedstock C), the inspections of which are given in Table I, was reformed in a one reactor pilot plant unit in a first run with once-through pure hydrogen wherein the first 33-⅓ percent of the reactor was charged with a rhenium promoted platinum-rhenium catalyst containing rhenium:platinum in a 1:1 weight ratio, and the last, or exit side of the reactor was charged with 66-⅔ percent of a rhenium promoted, platinum-rhenium catalyst containing rhenium:platinum in an approximately 2:1 weight ratio. In other words, the forward portion of the reaction zone contained 33-⅓ percent of the total catalyst charge to the unit as a conventional platinum-rhenium catalyst, and the rearward-most portion of the reaction zone contained 66-⅔ percent of the total catalyst to the unit as a high rhenium, rhenium promoted platinum catalyst.

(B) For purposes of comparison, a second run was made wherein Feedstock C was reformed in a one reactor unit at similar conditions over similar catalysts except that in this instance the lead portion of the reactor was packed with two-third by weight of the low rhenium, platinum-rhenium catalyst and the rearward portion of the reactor with one-third by weight of the high rhenium, platinum-rhenium catalyst.

(C) For further comparison, in a third run the entire reactor was 100 percent charged with the low rhenium, platinum-rhenium catalyst and Feedstock C again reformed thereover at similar conditions. No high rhenium, platinum-rhenium catalyst was used in this run.

In conducting each of Runs (a), (b), and (c), supra, the reactions were each initially conducted by contacting the catalysts with the oil at 268 psig, 3300 SCF/B, 905° F. temperature (which in a commercial unit which uses 66% pure recycle hydrogen is equivalent to 375 psig, 5000 SCF/B, and 905° F.). After about 2650 hours on oil, unit conditions were shifted from 268 psig, 3300 SCF/B once-through H₂ to 173 psig, 2100 SCF/B once-through H₂, this shift accelerating the deactivation rates. (These conditions simulate commercial unit conditions of 375 psig, 5000 SCF/B recycle gas and 225 psig, 3000 SCF/B recycle gas respectively.) After 2980 hours on oil, the conditions were shifted back to 268 psig, 3300 SCF/Bbl.

The results of these runs are given in Table III. The relative activities and $C_5+$ liquid for each run are given for before pressure reduction and after pressure reduction.

TABLE III

| Catalyst | Before Pressure Reduction | | After Pressure Reduction | |
|---|---|---|---|---|
| | Activity | $C_5+$ LV % | Activity | $C_5+$ LV % |
| (a) 33⅓ Low Re, Pt—Re/66⅔% High Re, Pt—Re | 58 | 70.7 | 35 | 68.7 |
| (b) 66⅔ Low Re, Pt—Re/33⅓% High Re, Pt—Re | 48 | 70.9 | 30 | 67.9 |
| (c) 100% Low Re, Pt—Re | 41 | 70.1 | 20 | 66.5 |

The advantages demonstrated for use of a high rhenium, platinum-rhenium catalyst loaded into more than 40 percent of the total rearward reactor volume, with low rhenium, platinum-rhenium catalyst loaded into the forward reactor volume, are apparent from these data; with even larger gains being made in activity and $C_5+$ liquid volume yield at higher severity conditions. It is thus clearly demonstrated that the catalyst system with 66-⅔% high rhenium, platinum-rhenium catalyst had equivalent yields and higher activity than the system with 33-⅓% high rhenium, platinum-rhenium catalyst. After the pressure reduction the run with 66-⅔% high rhenium, platinum-rhenium catalyst unquestionably showed better yields than the system with the 33-⅓% high rhenium, platinum-rhenium catalyst; and, of course, better activity and yields than the system wherein no high rhenium, platinum-rhenium catalyst was used. These results clearly indicate that the use of 40% and greater total high rhenium, platinum-rhenium catalyst charges contained in the rearwardmost portion of the total reactor space are preferred over similar runs with, e.g., 30 to 40% high rhenium, platinum-rhenium catalyst charges occupying this same reactor space.

Additional runs using the feed, equipment, and catalysts described by reference to the preceding Demonstrations (A), (B) and (C), of Demonstrations (II), were conducted at once-through H₂ conditions of 146 psig, 2400 SCF H₂/Bbl (equivalent to 175 psig, 3000 SCF H₂/Bbl in a recycle unit). The results of these runs, which are given in Table IV, confirmed the large activity and stability advantages of systems with greater than 40% high rhenium, platinum-rhenium loadings employed in the rearwardmost reaction zone of unit. As shown in Table IV, the superior stability of a system comprised of 66-⅔% high rhenium, platinum-rhenium catalyst resulted in a 0.8 LV% yield credit as contrasted with the 33-⅓% high rhenium, platinum-rhenium catalyst, by midrun at the severe 146 psig, 2400 SCF/B conditions. The credit further increased to over 1.5 LV% as the runs progressed, this being indicative of the greater stability at the low pressure/low treat gas conditions. The advantages are, of course, even greater when contrasted with the run wherein the conventional platinum-rhenium catalyst is employed to the exclusion of the high rhenium, platinum-rhenium catalyst.

TABLE IV

Midrun Catalyst Performance at
Severe 146 psig, 2400 SCF/Bbl Conditions

| | Activity | $C_5+$ LV % Yield |
|---|---|---|
| All low rhenium | 31 | 73.8 |
| 33⅓/3% high rhenium | 36 | 75.0 |
| 66⅔/3% high rhenium | 40 | 75.8 |

The present invention will be more fully understood, and appreciated by reference to the following exemplary, and comparative data. All units are in terms of weight except as otherwise specified. These data illustrate the more salient features of the invention, to wit:

EXAMPLE 1

In accordance with this example, a light Arabian feedstock (Feedstock C) was reformed in a first series of two runs in a one-reactor pilot plant unit utilizing once-through hydrogen, the forward portion (33%) of which was charged with low rhenium, platinum-rhenium catalyst (1:1 Re/Pt), and the rearward portion (67%) of which was charged with high rhenium, platinum-rhenium catalyst (2:1 Re/Pt). The third of a first series of runs was made in a four reactor unit, the first two reactors of which was charged with a low rhenium, platinum-rhenium catalyst (1:1 Re/pt), and the last two reactors of which was charged with high rhenium, platinum-rhenium catalyst (2:1 Re/Pt), i.e., 57% of the total catalyst charge to the unit. In the first two runs the temperature was increased after start-of-run to maintain the target octane. These runs were conducted at 175 psig and 3000 SCF/Bbl to produce 99 RON gasoline. In the third run, the charge feed rate was varied rather than temperature to maintain target oxtane, this run also having been conducted at 175 psig and 3000 SCF/Bbl. The data from these runs are given in Table V, Column 1 defining the loading of the high rhenium, platinum-rhenium catalyst in the rearward portion of the reactor, Column 2 defining the start-up temperature and Column 3 defining the temperature at the end of 250 hours on oil. In Columns 4 and 5, respectively, there is given the $C_5+$ liquid yield, and the percent activity or the life remaining in the catalyst, at the end of the 250 hour operating period.

TABLE V

| High Re, Pt—Re Catalyst Loading, % of Total Charge | Nominal Start-of-run Temp., °F., EIT | Temp. @ 250 Hrs. | $C_5+$ LV % Yields @ 99 RON | % of Remaining Activity @ 250 Hrs. |
|---|---|---|---|---|
| 67 | 865 | 878 | 74.1 | 67% |
| 67 | 895 | 902 | 76.6 | 61% |
| 56 | 950 | 950 | 77.0 | 34% |

These data clearly show the advantages of a high temperature start-up for temperatures ranging just above about 865° F. to temperatures of below about 950° F.

EXAMPLE 2

The following data, as presented in Table VI, was obtained in the one-reactor pilot plant unit, again at isothermal conditions using once-through hydrogen, to obtain 99 RON gasoline.

TABLE VI

| Conditions | Nominal Start-of-run °F., EIT | High Re, Pt—Re Catalyst Loading, % of Total Charge | Max $C_5^+$ LV % | °F., EIT @ Max $C_5^+$ |
|---|---|---|---|---|
| 175 psig, 3000 SCF/B | 895 | 67 | 76.5 | 920 |
| 220 psig, 4000 SCF/B | 895 | 67 | 74.5 | 929 |
| 175 psig, 3000 SCF/B | 865 | 67 | 74.4 | 912 |
| 375 psig, 5000 SCF/B | 905 | 67 | 71.3 | 923 |
| 175 psig, 3000 SCF/B | 895 | 33 | 76.4 | 914 |
| 175 psig, 3000 SCF/B | 895 | 90 | 76.7 | 920 |

The catalyst employed in accordance with this invention is necessarily constituted of composite particles which contain, besides a carrier or support material, a hydrogenation-dehydrogenation component, or components, a halide component and, preferably, the catalyst is sulfided. The support material is constituted of a porous, refractory inorganic oxide, particularly alumina. The support can contain, e.g., one or more of alumina, bentonite, clay, diatomaceous earth, zeolite, silica, activated carbon, magnesia, zirconia, thoria, and the like; though the most preferred support is alumina to which, if desired, can be added a suitable amount of other refractory carrier materials such as silica, zirconia, magnesia, titania, etc., usually in a range of about 1 to 20 percent, based on the weight of the support. A preferred support for the practice of the present invention is one having a surface area of more than 50 m²/g, preferably from about 100 to about 300 m²/g, a bulk density of about 0.3 to 1.0 g/ml, preferably about 0.4 to 0.8 g/ml, an average pore volume of about 0.2 to 1.1 ml/g, preferably about 0.3 to 0.8 ml/g, and an average pore diameter of about 30 to 300 Å.

The metal hydrogenation-dehydrogenation component can be composited with or otherwise intimately associated with the porous inorganic oxide support or carrier by various techniques known to the art such as ion-exchange, coprecipitation with the alumina in the sol or gel form, and the like. For example, the catalyst composite can be formed by adding together suitable reagents such as a salt of platinum and ammonium hydroxide or carbonate, and a salt of aluminum such as aluminum chloride or aluminum sulfate to form aluminum hydroxide. The aluminum hydroxide containing the salts of platinum can then be heated, dried, formed into pellets or extruded, and then calcined in nitrogen or other non-agglomerating atmosphere. The metal hydrogenation components can also be added to the catalyst by impregnation, typically via an "incipient wetness" technique which requires a minimum of solution so that the total solution is absorbed, initially or after some evaporation.

It is preferred to deposit the platinum and rhenium metals, and additional metals used as promoters, if any, on a previously pilled, pelleted, beaded, extruded, or sieved particulate support material by the impregnation method. Pursuant to the impregnation method, porous refractory inorganic oxides in dry or solvated state are contacted, either alone or admixed, or otherwise incorporated with a metal or metals-containing solution, or solutions, and thereby impregnated by either the "incipient wetness" technique, or a technique embodying absorption from a dilute or concentrated solution, or solutions, with subsequent filtration or evaporation to effect total uptake of the metallic components.

Platinum in absolute amount, is usually supported on the carrier within the range of from about 0.01 to 3 percent, preferably from about 0.05 to 1 percent, based on the weight of the catalyst (dry basis). Rhenium, in absolute amount, is also usually supported on the carrier in concentration ranging from about 0.1 to about 3 percent, preferably from about 0.5 to about 1 percent, based on the weight of the catalyst (dry basis). The absolute concentration of each, of course, is preselected to provide the desired weight ratio of rhenium:platinum for a respective reactor of the unit, as heretofore expressed. For example, where rhenium is employed in concentration of 3 percent, based on the weight of the catalyst, and it is desired to provide rhenium:platinum in weight ratio of 1:1 then the catalyst will contain 3 weight percent rhenium and 3 weight percent platinum. When, e.g., a weight ratio of rhenium:platinum of 1.5:1 is desired, and the platinum is employed in concentration of 3 percent, based on the weight of the catalyst, then the catalyst will contain 4.5 weight percent rhenium. In general, no more than about 3 percent platinum is put on a catalyst, with adequate rhenium to provide the desired weight ratio of rhenium:platinum. For most commercial applications, no more than about 1 percent platinum is put on a catalyst, with adequate rhenium to provide the desired weight ratio of rhenium:platinum. For example, where it is desired to provide a weight ratio of rhenium:platinum of 3:1 and 1 weight percent platinum is employed on the catalyst, then 3 weight percent rhenium is added to the catalyst.

In the isomerization and paraffin dehydrocyclization zones, the rhenium is provided in major amount relative to the platinum whereas, in contrast, in the naphthene dehydrogenation zone the rhenium is provided in no more than about an equal amount, relative to the platinum, based on the weight of these metals, one with respect to the other. In compositing the metals with the carrier, essentially any soluble compound can be used, but a soluble compound which can be easily subjected to thermal decomposition and reduction is preferred, for example, inorganic salts such as halide, nitrate, inorganic complex compounds, or organic salts such as the complex salt of acetylacetone, amine salt, and the like. Where, e.g., platinum is to be deposited on the carrier, platinum chloride, platinum nitrate, chloroplatinic acid, ammonium chloroplatinate, platinum chloroplatinate, platinum polyamine, platinum acetylacetonate, and the like, are preferably used. A promoter metal, or metal other than platinum and rhenium, when employed, is added in concentration ranging from about 0.01 to 3 percent, preferably from about 0.05 to about 1 percent, based on the weight of the catalyst.

In preparing catalysts, the metals are deposited from solution on the carrier in preselected amounts to provide the desired absolute amount, and weight ratio of each respective metal. Albeit the solution, or solutions, may be prepared to nominally contain the required amounts of metals with a high degree of precision, as is well known, chemical analysis will show that the finally prepared catalyst, or catalyst charged into a reactor, will generally deviate negatively or positively with respect to the preselected nominal values. In general however, where, e.g., the final catalyst is to contain 0.3 wt. % platinum and 0.7 wt. % rhenium the preparation can be controlled to provide within a confidence level of 95 percent ±0.03 wt. % platinum and ±0.05 wt. % rhenium. Or where, e.g., the final catalyst is to contain 0.3 wt. % platinum and 0.3 weight percent rhenium, the preparation can be controlled to provide within a confidence level of 95 percent ±0.03 wt. % platinum and ±0.03 wt. % rhenium. Thus, a catalyst nominally containing 0.3 wt. % platinum and 0.7 wt. % rhenium is for practical purposes the equivalent of one which contains 0.3±0.03 wt. % platinum and 0.7±0.5 wt. % rhenium, and one which contains 0.3 wt. % platinum and 0.3 wt. % rhenium is for practical purposes the equivalent of one which contains 0.3±0.3 wt. % platinum and 0.3±0.03 wt. % rhenium, respectively.

To enhance catalyst performance in reforming operations, it is also required to add a halogen component to the catalysts, fluorine and chlorine being preferred halogen components. The halogen is contained on the catalyst within the range of 0.1 to 3 percent, preferably within the range of about 1 to about 1.5 percent, based on the weight of the catalyst. When using chlorine as halogen component, it is added to the catalyst within the range of about 0.2 to 2 percent, preferably within the range of about 1 to 1.5 percent, based on the weight of the catalyst. The introduction of halogen into catalyst can be carried out by any method at any time. It can be added to the catalyst during catalyst preparation, for example, prior to, following or simultaneously with the incorporation of the metal hydrogenation-dehydrogenation component, or components. It can also be introduced by contacting a carrier material in a vapor phase or liquid phase with a halogen compound such as hydrogen fluoride, hydrogen chloride, ammonium chloride, or the like.

The catalyst is dried by heating at a temperature above about 80° F., preferably between about 150° F. and 300° F., in the presence of nitrogen or oxygen, or both, in an air stream or under vacuum. The catalyst is calcined at a temperature between about 500° F. to 1200° F., preferably about 500° F. to 1000° F., either in the presence of oxygen in an air stream or in the presence of an inert gas such as nitrogen.

Sulfur is a highly preferred component of the catalysts, the sulfur content of the catalyst generally ranging to about 0.2 percent, preferably from about 0.05 percent to about 0.15 percent, based on the weight of the catalyst (dry basis). The sulfur can be added to the catalyst by conventional methods, suitably by breakthrough sulfiding of a bed of the catalyst with a sulfur-containing gaseous stream, e.g., hydrogen sulfide in hydrogen, performed at temperatures ranging from about 350° F. to about 1050° F. and at pressures ranging from about 1 to about 40 atmospheres for the time necessary to achieve breakthrough, or the desired sulfur level.

The feed or charge stock can be a virgin naphtha cracked naphtha, a naphtha from a coal liquefaction process, a Fischer-Tropsch naphtha, or the like. Such feeds can contain sulfur or nitrogen, or both, at fairly high levels. Typical feeds are those hydrocarbons containing from about 5 to 12 carbon atoms, or more preferably from about 6 to about 9 carbon atoms. Naphthas, or petroleum fractions boiling within the range of from about 80° F. to about 450° F., and preferably from about 125° F. to about 375° F., contain hydrocarbons of carbon numbers within these ranges. Typical fractions thus usually contain from about 15 to about 80 vol. % paraffins, both normal and branched, which fall in the range of about $C_5$ to $C_{12}$, from about 10 to 80 vol. % of naphthenes falling within the range of from about $C_6$ to $C_{12}$, and from 5 through 20 vol. % of the desirable aromatics falling within the range of from about $C_6$ to $C_{12}$.

The reforming runs are initiated by adjusting the hydrogen and feed rates, and the temperature and pressure to operating conditions. The run is continued at optimum reforming conditions by adjustment of the major process variables, within the ranges described below:

| Major Operating Variables | Typical Process Conditions | Preferred Process Conditions |
|---|---|---|
| Pressure, psig | 50–500 | 100–300 |
| Reactor Temp., °F. | 800–1200 | 850–1050 |
| Recycle Gas Rate, SCF/B | 1000–10,000 | 1500–5000 |
| Feed Rate, W/Hr/W | 0.5–10 | 0.5–5 |

It is apparent that various modifications and changes can be made without departing from the spirit and scope of the present invention.

Having described the invention, what is claimed is:

1. In a process for reforming, with hydrogen, a naphtha feed in a reforming unit having at least one catalyst-containing on stream reactor through which the hydrogen and naphtha are heated and flowed to contact the catalyst at reforming conditions,
   wherein from about 40 percent to about 90 percent, based on the total weight of catalyst in said reactor, of a rhenium promoted platinum catalyst, the weight ratio of rhenium:platinum being at least about 1.5:1, is concentrated within the most rearward reaction zone of the reactor, and
   wherein a platinum catalyst, or rhenium promoted platinum catalyst which contains rhenium in concentration providing a weight ratio of rhenium:platinum of up to about 1.2:1 is concentrated within the most forward reaction zone of the reactor,
   the improvement comprising
   maintaining a start-of-run temperature ranging from about 875° F. to about 935° F.

2. The process of claim 1 wherein the weight ratio of rhenium:platinum contained in the catalyst of the rearward reaction zone is at least about 2:1.

3. In a process for reforming, with hydrogen, a naphtha feed in a reforming unit which contains a plurality of catalyst-containing on-stream reactors connected in series, the hydrogen and naphtha being heated and flowed from one reactor to another to contact the catalyst contained therein at reforming conditions,
   wherein from about 40 percent to about 90 percent, based on the total weight of catalyst in all of the reactors of the unit, of a rhenium promoted platinum catalyst, the weight ratio of rhenium:platinum being at least about 1.5:1, is concentrated within the most rearward reactors of the series, and
   wherein a platinum catalyst, or rhenium promoted platinum catalyst which contains rhenium in concentration providing a weight ratio of rhenium:platinum of up to about 1.2:1 is concentrated within the most forward reactor of the series,
   the improvement comprising maintaining a start-of-run temperature ranging from about 875° F. to about 935° F.

4. The process of claim 3 wherein the weight ratio of rhenium:platinum in the rhenium promoted platinum catalyst of the most rearward reactors of the series is at least about 2:1.

5. The process of claim 3 wherein the weight ratio of rhenium:platinum in the catalyst of the most rearward reactors of the series ranges from about 2:1 to about 3:1.

6. The process of claim 3 wherein the high rhenium, rhenium promoted platinum catalyst charged into the reactors contains from about 0.01 to about 3 weight percent platinum.

7. The process of claim 6 wherein the high rhenium, rhenium promoted platinum catalyst charged into the reactors contains from about 0.05 to about 1 weight percent platinum.

8. The process of claim 3 wherein the high rhenium, rhenium promoted platinum catalyst charged into the reactors contains from about 0.1 to about 3 weight percent rhenium.

9. The process of claim 8 wherein the high rhenium, rhenium promoted platinum catalyst charged into the reactors contains from about 0.5 to about 1 weight percent rhenium.

10. The process of claim 3 wherein the high rhenium, rhenium promoted platinum catalyst charged into the reactors contains from about 0.01 to about 3 weight percent platinum, and sufficient rhenium to provide the expressed ratio of rhenium:platinum.

11. The process of claim 3 wherein the high rhenium, rhenium promoted platinum catalyst charged into the reactors contains from about 0.1 to about 3 weight percent rhenium, and sufficient platinum to provide the expressed ratio of rhenium:platinum.

12. The process of claim 3 wherein the high rhenium, rhenium promoted platinum catalyst charged into the reactors contains from about 0.1 to about 3 weight percent halogen.

13. The process of claim 3 wherein the high rhenium, rhenium promoted platinum catalyst charged into the reactors contains from about 1 to about 1.5 weight percent halogen.

14. The process of claim 3 wherein the high rhenium, rhenium promoted platinum catalyst charged into the reactors is sulfided, and contains to about 0.2 weight percent sulfur.

15. The process of claim 3 wherein the reactor unit is operated in a semi-regenerative mode.

16. The process of claim 15 wherein the start-of-run temperature ranges from about 895° F. to about 925° F.

17. The process of claim 3 wherein the reactor unit is operated in a cyclic mode at temperatures ranging from about 905° F. to about 935° F.

18. The process of claim 17 wherein the temperature ranges from about 905° F. to about 930° F.

19. In a process for reforming, with hydrogen, a naphtha feed in a reforming unit having at least one catalyst-containing on steam reactor through which the hydrogen and naphtha are heated and flowed to contact the catalyst at reforming conditions, through a series of naphthene dehydrogenation, isomerization and paraffin dehydrocyclization zones
wherein from about 40 percent to about 90 percent, based on the total weight of catalyst in said reactor, of a rhenium promoted platinum catalyst, the weight ratio of rhenium:platinum being at least about 1.5:1, is concentrated within the isomerization and paraffin dehydrocyclization zones of the reactor, and
wherein a platinum catalyst, or rhenium promoted platinum catalyst which contains rhenium in concentration providing a weight ratio of rhenium:platinum of up to about 1.2:1 is concentrated within the naphthene dehydrogenation zone of the reactor,
the improvement comprising
maintaining a start-of-run temperature ranging from about 875° F. to about 935° F.

20. The process of claim 19 wherein the weight ratio of rhenium:platinum contained in the catalyst of the isomerization and paraffin dehydrocyclization zones is at least about 2:1.

21. In a process for reforming, with hydrogen, a naphtha feed in a reforming unit which contains a plurality of catalyst-containing on-stream reactors connected in series, the hydrogen and naphtha being heated and flowed from one reactor to another to contact the catalyst contained therein at reforming conditions, through a series of naphthene dehydrogenation, isomerization and paraffin dehydrocyclization zones,
wherein from about 40 percent to about 90 percent, based on the total weight of catalyst in all of the reactors of the unit, of a rhenium promoted platinum catalyst, the weight ratio of rhenium:platinum being at least about 1.5:1, is concentrated within the isomerization and paraffin dehydrocyclization zones of the reactors of the series, and
wherein a platinum catalyst, or rhenium promoted platinum catalyst which contains rhenium in concentration providing a weight ratio or rhenium:platinum of about 1.2:1 concentrated within the naphthene dehydrogenation zone of the reactors of the series,
the improvement comprising
maintaining a start-of-run temperature ranging from about 875° F. to about 935° F.

22. The process of claim 21 wherein the weight ratio of rhenium:platinum in the rhenium promoted platinum catalyst of the isomerization and paraffin dehydrocyclization zones of the reactors of the series is at least about 2:1.

23. The process of claim 21 wherein the weight ratio of rhenium:platinum in the catalyst of the isomerization and paraffin dehydrocyclization zone of the reactors of the series ranges from about 2:1 to about 3:1.

24. The process of claim 21 wherein the high rhenium, rhenium promoted platinum catalyst charged into the reactors contains from about 0.01 to about 3 weight percent platinum.

25. The process of claim 24 wherein the high rhenium, rhenium promoted platinum catalyst charged into the reactors contains from about 0.05 to about 1 weight percent platinum.

26. The process of claim 21 wherein the high rhenium, rhenium promoted platinum catalyst charged into the reactors contains from about 0.1 to about 3 weight percent rhenium.

27. The process of claim 26 wherein the high rhenium, rhenium promoted platinum catalyst charged into the reactors contains from about 0.5 to about 1 weight percent rhenium.

28. The process of claim 21 wherein the high rhenium, rhenium promoted platinum catalyst charged into the reactors contains from about 0.01 to about 3 weight percent platinum, and sufficient rhenium to provide the expressed ratio of rhenium:platinum.

29. The process of claim 21 wherein the high rhenium, rhenium promoted platinum catalyst charged into the reactors contains from about 0.1 to about 3 weight percent rhenium, and sufficient platinum to provide the expressed ratio of rhenium:platinum.

30. The process of claim 21 wherein the high rhenium, rhenium promoted platinum catalyst charged into the reactors contains from about 0.1 to about 3 weight percent halogen.

31. The process of claim 21 wherein the high rhenium, rhenium promoted platinum catalyst charged into the reactors contains from about 1 to about 1.5 weight percent halogen.

32. The process of claim 21 wherein the high rhenium, rhenium promoted platinum catalyst charged into the reactors is sulfided, and contains to about 0.2 weight percent sulfur.

33. The process of claim 3 wherein the reactor unit is operated in a semi-regenerative mode.

34. The process of claim 33 wherein the start-of-run temperature ranges from about 895° F. to about 925° F.

35. The process of claim 3 wherein the reactor unit is operated in a cyclic mode at temperatures ranging from about 905° F. to about 935° F.

36. The process of claim 35 wherein the temperature ranges from about 905° F. to about 930° F.

* * * * *